(12) United States Patent
Weingartz et al.

(10) Patent No.: US 8,504,267 B2
(45) Date of Patent: Aug. 6, 2013

(54) CONTROL SYSTEM AND METHOD FOR SYNCHRONIZATION CONTROL IN DUAL CLUTCH TRANSMISSIONS

(75) Inventors: Christopher Jay Weingartz, Holly, MI (US); Steven P. Moorman, Dexter, MI (US); Xuefeng Tim Tao, Northville, MI (US); Chinar S. Ghike, Livonia, MI (US); Andreas Gustavsson, Lidkoping (SE)

(73) Assignee: GM Global Technology Operations LLC

( * ) Notice: Subject to any disclaimer, the term of this patent is extended or adjusted under 35 U.S.C. 154(b) by 333 days.

(21) Appl. No.: 12/850,096

(22) Filed: Aug. 4, 2010

(65) Prior Publication Data
US 2011/0257857 A1    Oct. 20, 2011

Related U.S. Application Data

(60) Provisional application No. 61/324,515, filed on Apr. 15, 2010.

(51) Int. Cl.
*G06F 19/00* (2011.01)
(52) U.S. Cl.
USPC .......................................... 701/68; 74/336 R
(58) Field of Classification Search
USPC ................ 701/58, 60, 66, 67, 68; 477/77, 79, 477/80, 83, 84, 86, 166, 171, 174, 175, 176, 477/124, 160, 161; 192/3.58, 103 C, 103 F; 74/330, 336 R
See application file for complete search history.

(56) References Cited

U.S. PATENT DOCUMENTS

| | | | | |
|---|---|---|---|---|
| 5,046,174 A * | 9/1991 | Lentz et al. | ...................... | 701/60 |
| 5,072,390 A * | 12/1991 | Lentz et al. | ...................... | 701/60 |
| 5,417,402 A | 5/1995 | Speybroeck | | |
| 5,683,329 A * | 11/1997 | Kono et al. | ................... | 477/176 |
| 5,890,392 A * | 4/1999 | Ludanek et al. | ................ | 74/331 |
| 5,993,350 A * | 11/1999 | Lawrie et al. | ...................... | 477/5 |
| 6,070,117 A | 5/2000 | Yamada et al. | | |
| 6,164,149 A * | 12/2000 | Ohmori et al. | .............. | 74/336 R |
| 6,253,140 B1 * | 6/2001 | Jain et al. | ......................... | 701/67 |
| 6,276,224 B1 | 8/2001 | Ueda et al. | | |
| 6,568,515 B2 | 5/2003 | Harries | | |
| 6,619,152 B2 | 9/2003 | Ochi et al. | | |
| 6,694,834 B2 | 2/2004 | Bansbach et al. | | |
| 6,997,849 B2 | 2/2006 | Stasik et al. | | |

(Continued)

OTHER PUBLICATIONS

U.S. Appl. No. 12/850,159, filed Aug. 4, 2010, Weingartz et al.

(Continued)

*Primary Examiner* — Khoi Tran
*Assistant Examiner* — Adam Mott (57) ABSTRACT

A control system includes a pressure control solenoid and a flow control solenoid having an input in fluid communication with the pressure control solenoid. A piston adjusts a position of a shift fork and includes a first area in fluid communication with the pressure control solenoid and a second area in fluid communication with the flow control solenoid. A fork sensor senses a position of a shift fork. A slip sensing module estimates slip acceleration between an input shaft and a gear. A flow determining module generates a flow command for the flow control solenoid. A sync control module determines a slip acceleration profile including an estimated slip acceleration, adjusts the estimated slip acceleration based on the measured slip acceleration, and generates a pressure command for the pressure control solenoid based on the adjusted slip acceleration.

10 Claims, 6 Drawing Sheets

U.S. PATENT DOCUMENTS

| | | |
|---|---|---|
| 7,228,216 B2 | 6/2007 | Inoue |
| 7,682,285 B2 * | 3/2010 | Kraska et al. ............... 477/130 |
| 7,706,949 B2 * | 4/2010 | Sah et al. ...................... 701/51 |
| 7,757,577 B2 | 7/2010 | Kawamoto et al. |
| 8,079,936 B2 * | 12/2011 | MacFarlane et al. ......... 477/109 |
| 2002/0014130 A1 | 2/2002 | Ogami et al. |
| 2005/0107214 A1 * | 5/2005 | Koenig ........................ 477/174 |
| 2005/0132832 A1 | 6/2005 | Yasui et al. |
| 2008/0161159 A1 * | 7/2008 | Runde et al. ................. 477/156 |
| 2008/0202853 A1 | 8/2008 | Ogami |
| 2008/0210032 A1 * | 9/2008 | Uberti et al. ................... 74/335 |
| 2008/0234105 A1 | 9/2008 | Sakamoto et al. |
| 2009/0118082 A1 * | 5/2009 | Heap et al. ...................... 477/5 |
| 2009/0165584 A1 | 7/2009 | Ishii |
| 2009/0211862 A1 * | 8/2009 | Moorman et al. ............. 192/40 |
| 2009/0247358 A1 * | 10/2009 | Kojima et al. ................. 477/80 |
| 2011/0168510 A1 | 7/2011 | Lundberg et al. |

OTHER PUBLICATIONS

U.S. Appl. No. 12/850,083, filed Aug. 4, 2010, Weingartz et al.

\* cited by examiner

CONTROL SYSTEM AND METHOD FOR SYNCHRONIZATION CONTROL IN DUAL CLUTCH TRANSMISSIONS

CROSS REFERENCE TO RELATED APPLICATIONS

This application claims the benefit of U.S. Provisional Application No. 61/324,515, filed on Apr. 15, 2010, which is hereby incorporated by reference in its entirety.

This application is related to U.S. patent application Ser. Nos. 12/850,159 filed on Aug. 4, 2010, and 12/850,083 filed on Aug. 4, 2010. The disclosures of the above applications are incorporated herein by reference in their entirety.

FIELD

The present disclosure relates to dual clutch transmissions, and more particularly to a control system and method for synchronization control in dual clutch transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When a driver wants to change from one gear to another in a car with a manual transmission, the driver depresses a clutch pedal. The clutch disconnects the engine and interrupts power flow. Then the driver uses a manual stick shift to select another gear. The manual stick shift is connected by a mechanical linkage assembly to shift forks. The shift forks are attached to gear selectors, which deselect one gear and select another gear.

The gear selectors may include synchronizers to match a speed of the gear selector to the gear to prevent grinding. Once the new gear is engaged, the driver releases the clutch pedal to re-connect the engine and transmit power to the wheels.

As can be appreciated from the foregoing, manual transmissions do not provide a continuous flow of power from the engine to the wheels. Instead, power delivery changes from on to off (when the clutch is disengaged) and from off to on (when the clutch is engaged and the transmission is in gear). As can be appreciated, a loss of efficiency and reduced performance occurs during periods when the manual transmission is disengaged. Furthermore, the on/off nature of power delivery provided by the manual transmission can be annoying.

A dual-clutch transmission (DCT) uses two clutches but does not include a clutch pedal. One clutch may be used to control a first subset of gears (such as first, third, and fifth) while the other clutch may be used to control a second subset of the gears (such as second, fourth and sixth). Using this arrangement, a different gear can be preselected before the shift to prevent interruption in the power flow from the engine to the transmission. As a result, efficiency and performance is improved.

A powertrain control module and a hydraulic control system may be used to control operation of the clutches, shift forks and gear selectors. It is difficult to control the shift forks during synchronization and engagement or disengagement of the gear selectors. As a result, some DCTs may generate a banging noise when shifting. Furthermore, a significant amount of time and effort may be needed to calibrate the powertrain control module and hydraulic control system to shift with acceptable shift quality and speed.

SUMMARY

A control system includes a pressure control solenoid and a flow control solenoid having an input in fluid communication with the pressure control solenoid. A piston adjusts a position of a shift fork and includes a first area in fluid communication with the pressure control solenoid and a second area in fluid communication with the flow control solenoid. A fork position sensor senses a position of a shift fork. A slip sensing module estimates slip acceleration between an input shaft and a gear. A flow determining module generates a flow command for the flow control solenoid. A sync control module determines a slip acceleration profile including an estimated slip acceleration, adjusts the estimated slip acceleration based on the measured slip acceleration, and generates a pressure command for the pressure control solenoid based on the adjusted slip acceleration.

In other features, the sync control module includes a slip acceleration module that generates the slip acceleration profile based on an initial slip acceleration and a predetermined sync time. The sync control module further includes an error module that generates a slip acceleration error based on the estimated slip acceleration and the measured slip acceleration. The sync control module further includes a summing module that generates the adjusted slip acceleration based on the estimated slip acceleration and the slip acceleration error. The sync control module further includes a force converter module that generates a force command based on the adjusted slip acceleration.

In other features, the sync control module further includes a pressure converter module that generates the pressure command based on the force command. The slip acceleration profile includes a first portion that ramps to a maximum value, a second portion that is constant at the maximum value, and a third portion that ramps towards zero at a first rate. The second area is larger than the first area. The shift fork is moved from a neutral position to a sync position. The flow command is a constant flow command during synchronization.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure relates to control systems and methods for controlling fork actuators in a DCT during synchronization. In some implementations, fork actuators include two-sided pistons. A flow control (FC) solenoid may be connected to one side of the piston and a pressure control (PC) solenoid may be connected to the other side of the piston. The PC solenoid may feed the FC solenoid.

During synchronization, force is controlled to the piston of the fork actuator by setting the FC solenoid to a constant value and varying the pressure command to the piston using the PC solenoid. During synchronization, a shaft acceleration profile is calculated to bring a slip speed of the synchronizer from a level at the beginning of the synchronization event to zero during a predetermined period. The force that is commanded is a function of commanded shaft acceleration and synchronizer characteristics. The present disclosure allows smooth control of synchronization events in DCTS within a predetermined amount of time with minimal calibration effort.

During the synchronization event, the flow control solenoid is set to a constant level and the pressure control solenoid is used to apply a force to the synchronizer. The force reduces the slip between the input shaft and the gear to zero. The synchronizer slip is a function of the measured output speed of the transmission, the measured speed of the shaft that the synchronizer rotates on, and the gear ratio between the two.

When the synchronizer slip is reduced to zero, the synchronization event is complete. In order to complete synchronization, a slip acceleration profile is commanded that is a function of the slip at the beginning of the event and the calibrated time to complete the event. This profile is shaped by a ramp from the rate that slip is changing at the beginning of the event to the maximum acceleration and a ramp at the end from maximum acceleration to zero. These ramps are calibrated as percentages of the total calibrated synchronization time.

The shaft acceleration command is then converted to a force command as a function of reflected inertia and synchronizer capacity. The force command is then sent to the pressure control solenoid as a pressure command. The pressure command is equal to the force divided by the area of the piston that is being acted on. A closed loop approach is used to ensure that the actual shaft acceleration follows the commanded profile. The closed control loop uses the rate of change of the synchronizer slip as a feedback and makes corrections based on the difference between the commanded profile and the actual acceleration.

In some implementations, the two sides of the fork actuator pistons have different areas. The FC solenoid may be connected to a larger area of the two sides. The PC solenoid may be connected to a smaller area of the two sides. The PC solenoid also feeds pressure to the FC solenoid attached to the other side of the fork actuator piston.

Figure 1:
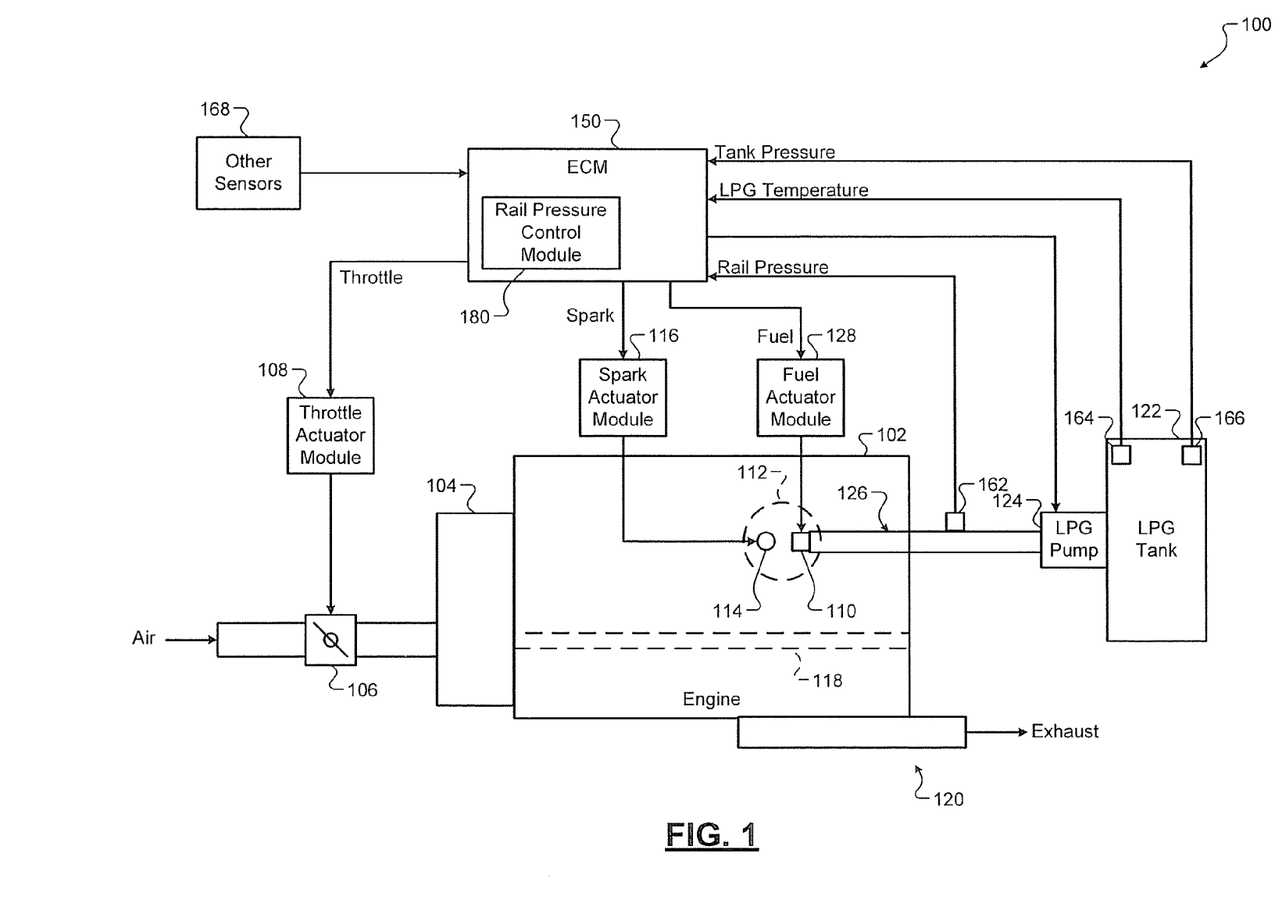
FIGS. 1 and 2 are functional block diagrams of a control system for a dual clutch transmission.
Figure 2:
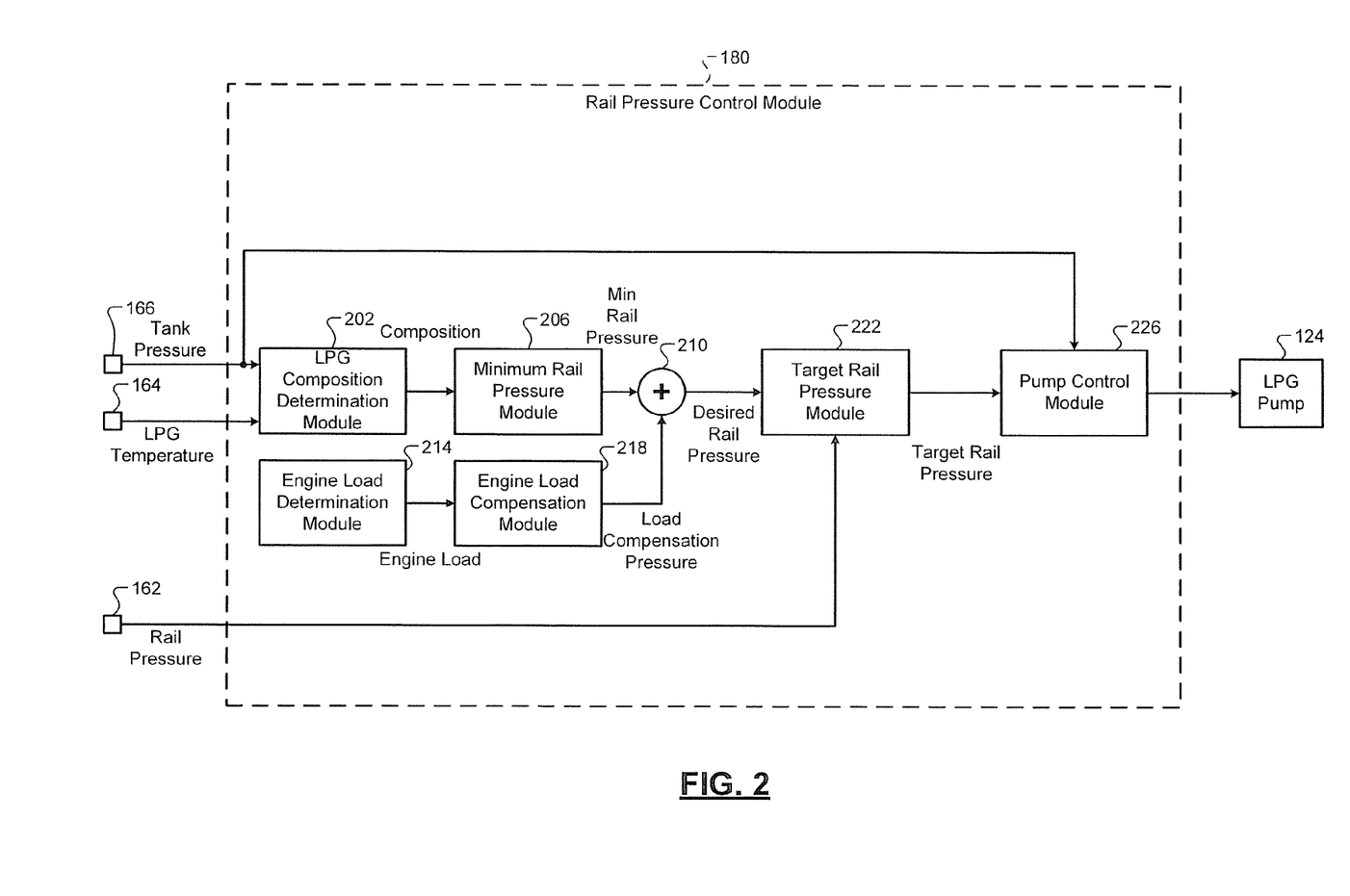

Referring now to FIGS. 1 and 2, an exemplary control system 10 for the DCT is shown. A pump 14 pumps a fluid through a filter 16. A bypass 18 may be provided around the filter 16. An output of the filter 16 is supplied to an accumulator 20. A check ball 19 may be arranged between the filter 16 and the accumulator 20. An output of the accumulator 20 passes through a heat sync 22 before being supplied to pressure control (PC) solenoids 28-1, 28-2, 28-3 and 28-4 (collectively PC solenoids 28).

An output of the PC solenoid 28-1 is fed to a flow control (FC) solenoid 30-1. An output of the FC solenoid 30-1 is fed to a clutch 34-1. A clutch position sensor (CPS) 36-1 senses a position of the clutch 34-1. In some implementations, the clutch 34-1 may be associated with odd gears of the DCT.

An output of the PC solenoid 28-2 is fed to a FC solenoid 30-2. An output of the FC solenoid 30-2 is fed to a clutch 34-2. A CPS 36-2 senses a position of the clutch 34-2. In some implementations, the clutch 34-2 may be associated with even gears of the DCT.

An output of a PC solenoid 28-3 is fed to a first logic valve 50-1. The output of the PC solenoid 28-3 is also fed to an FC solenoid 30-3. An output of the FC solenoid 30-3 is fed to the first logic valve 50-1. Outputs of the logic valve 50-1 are fed to a first fork actuator 52-1 and a second fork actuator 52-2, respectively. First and second fork actuators 52-1 and 52-2 include first and second pistons 54-1 and 54-2, respectively. First and second shift forks 56-1 and 56-2 are connected to ends of the first and second pistons 54-1 and 54-2, respectively. First and second fork position sensors 58-1 and 58-2 sense a position of the shift forks 56-1 and 56-2, respectively.

An output of a PC solenoid 28-4 is fed to a second logic valve 50-2. The output of the PC solenoid 28-4 is also fed to an FC solenoid 30-4. An output of the FC solenoid 30-4 is fed to the second logic valve 50-2. Outputs of the second logic valve 50-2 are fed to a third fork actuator 52-3 and a fourth fork actuator 52-4, respectively. Third and fourth fork actuators 52-3 and 52-4 include third and fourth pistons 54-3 and 54-4, respectively. Third and fourth shift forks 56-3 and 56-4 are connected to ends of the third and fourth pistons 54-3 and 54-4, respectively. Third and fourth fork position sensors 58-1 and 58-2 sense a position of the shift forks 56-3 and 56-4, respectively.

Various check balls 60-1, 60-2 and 60-3 may be used as shown in the hydraulic circuits supplying the clutches 34-1 and 34-2. A secondary logic valve solenoid 62 receives fluid from the check ball 60-1 and supplies flew in to the second logic valve 50-2 and the first logic valve 50-1 via the second logic valve 50-2. For example, the shift fork 56-1 moves a gear selector 70 back and forth along a shaft 76 between gears 72 and 74.

In FIG. 2, a control module 80 communicates with the fork position sensors 58-1, 58-2, 58-3 and 58-4, the PC solenoids 28-1, 28-2, 28-3 and 20 8-4, the FC solenoids 30-1, 30-2, 30-3 and 30-4, the clutch position sensors 36-1 and 36-2, the first and second logic valve's 50-1 and 50-2, the secondary logic about 62 and the pressure sensor 24. The control module 80 controls positions of the clutches and shift forks as will be described further below to effectuate shifting of the DCT.

Additional inputs may include a transmission output speed sensor (TOSS) 92, and shaft speed sensor(s) 94 that sense speeds of one or more shafts on which the gear selectors reside.

Figure 3:
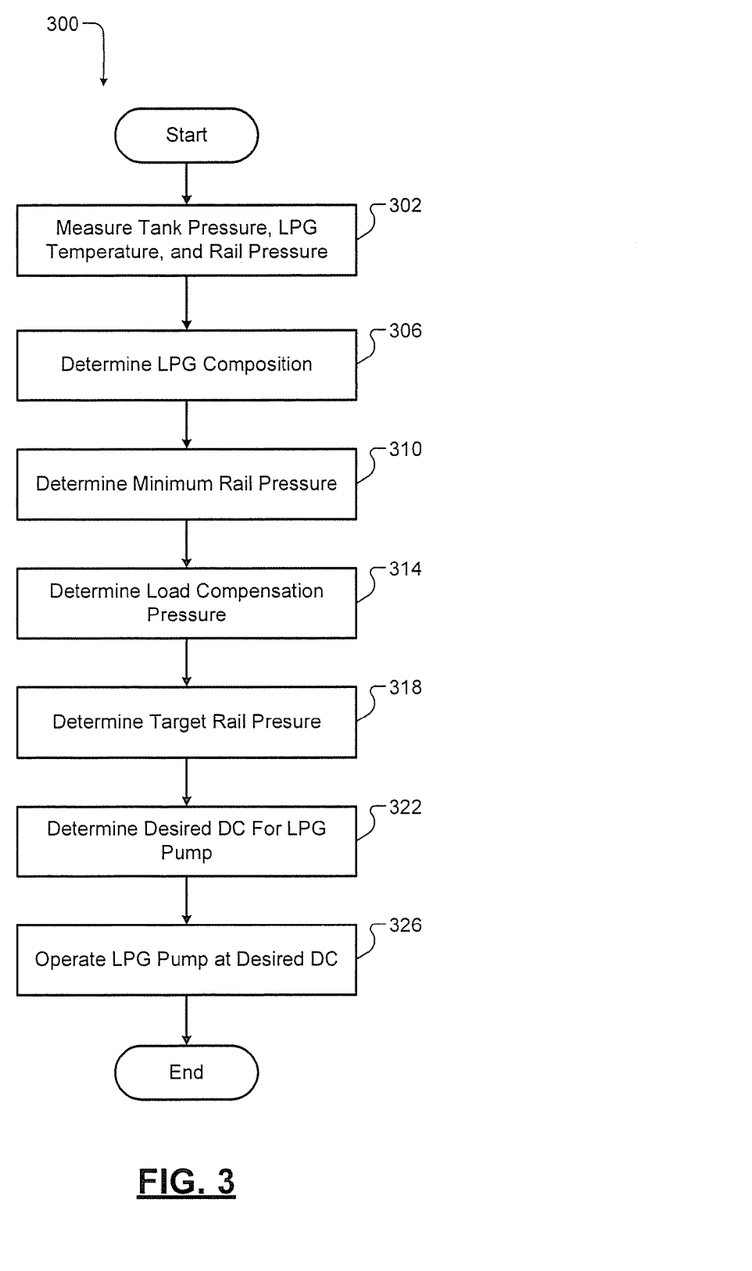
FIG. 3 is a functional block diagram of a sync module according to the present disclosure.

Referring now to FIG. 3, an exemplary sync module 100 according to the present disclosure is shown. The sync module 100 may be implemented in the control module 80 in FIG. 2 or any other control module associated with the vehicle. The sync module 100 includes a sync slip acceleration module 110 that generates a command slip acceleration based on an initial sync slip and a predetermined sync time.

An error module 114 receives actual slip acceleration and the slip acceleration command and generates a slip acceleration error. The slip acceleration command and the slip acceleration error are output to a summing module 118. The summing module 118 generates a difference between the slip acceleration command and the slip acceleration error. The summing module outputs an adjusted slip acceleration to a force converter module 122, which converts the adjusted slip acceleration to a force. A pressure converter module 124 converts the force to a pressure command for the PC solenoid.

A fork velocity module 128 generates a fork velocity based upon fork position. A sync complete module 132 determines when sync is complete based upon a least one of fork position, fork velocity and actual slip acceleration. When one or more of the sync complete conditions are present, the sync enable signal to the pressure converter module 124 goes low or the sync module is otherwise disabled.

Figure 4:
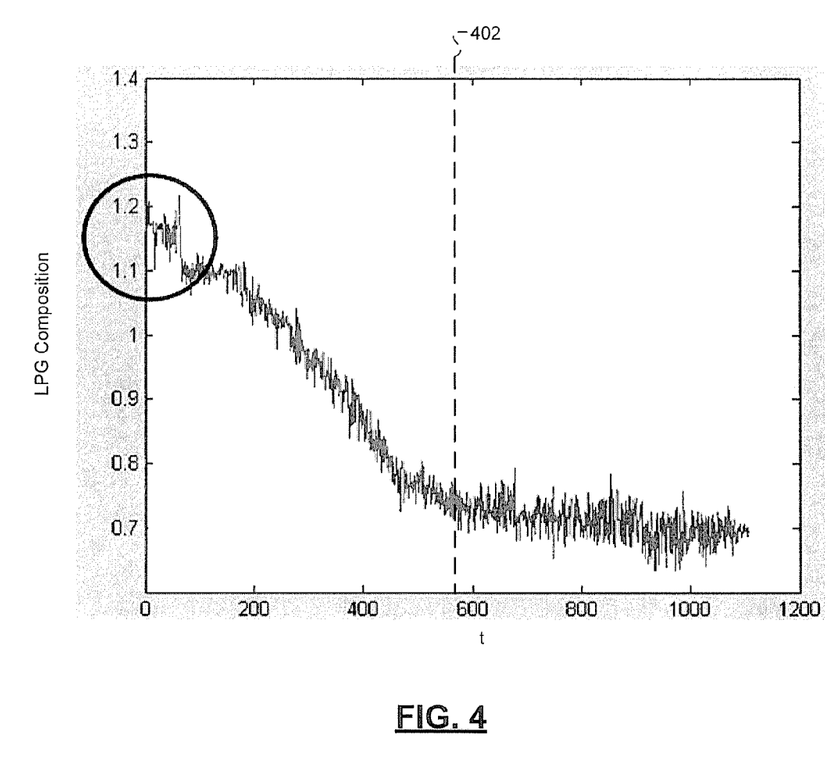
FIG. 4 is a flowchart illustrating a method for syncing a shift fork according to the present disclosure.

Referring now to FIG. 4, a method 150 for syncing a shift fork according to the present disclosure is shown. At 154, an initial sync slip and sync period are determined. At 158, a sync acceleration command is generated. At 162, a slip acceleration error is determined. At 164, the slip acceleration command is adjusted based on the slip acceleration error. At 168, a pressure command is calculated based upon the adjusted slip acceleration command. At 172, control determines whether the synchronization is complete. If not, control returns to 158. Otherwise, control ends.

Figure 5:
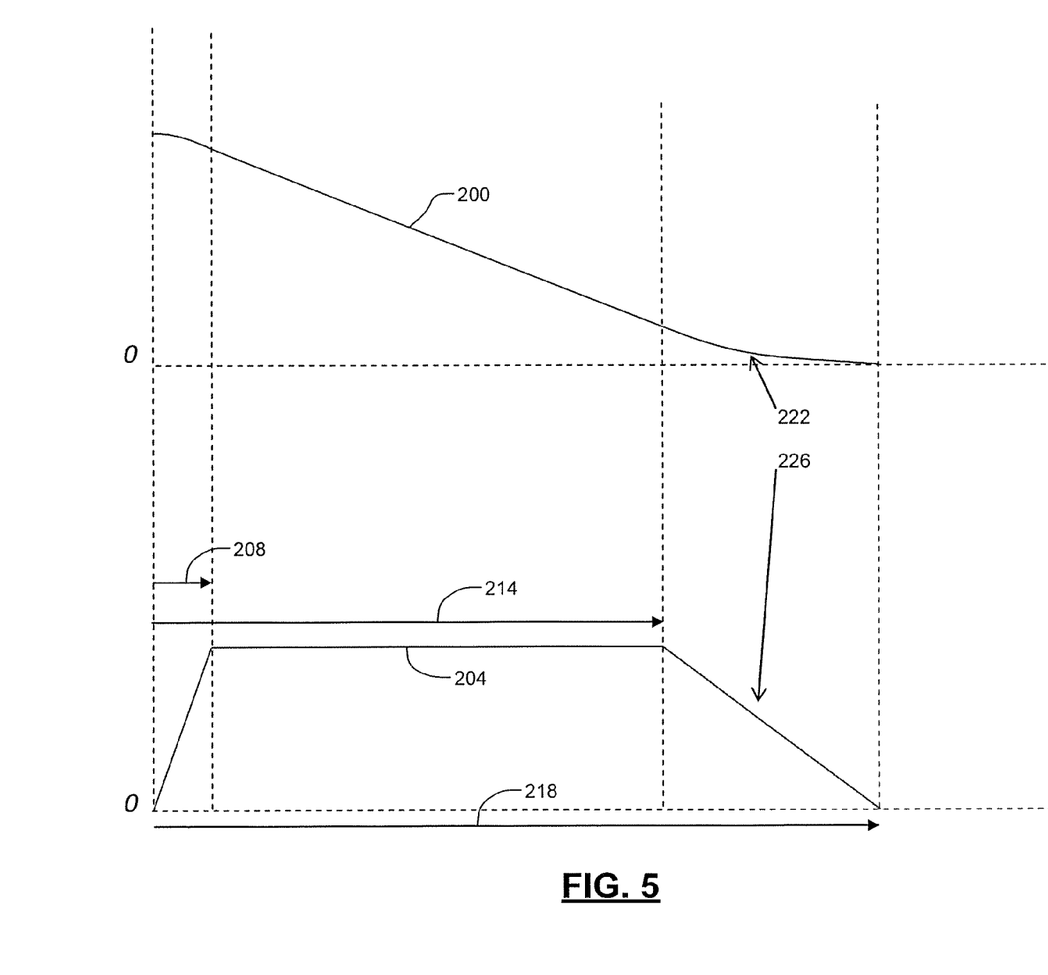
FIG. 5 illustrates synchronizer slip and an absolute slip acceleration profile during synchronization.

Referring now to FIG. 5, synchronizer slip 200 and an absolute slip acceleration profile 204 are shown during synchronization. The ramp rate at 226 provides a smooth transition of slip speed at 222. The time required to reach maximum slip acceleration is shown at 208. The percentage of the total time to decrease to a final slip acceleration is shown at 214. The total time required to complete the synchronization event is shown at 218.

Figure 6:
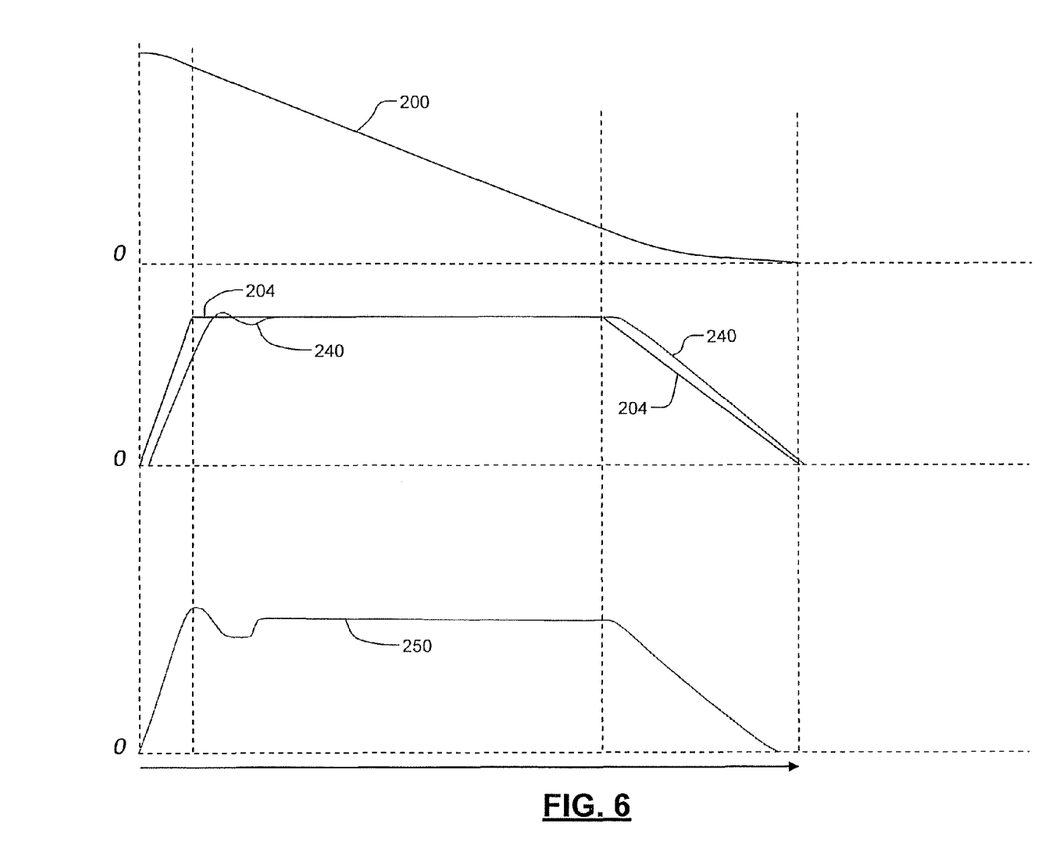
FIG. 6 illustrates synchronizer slip, the absolute slip acceleration profile, an actual acceleration profile, and a pressure command.

Referring now to FIG. 6, synchronizer slip 200 and an absolute slip acceleration profile 204 are shown during synchronization. An actual absolute acceleration profile 240 is shown. A pressure command 250 is adjusted based on feedback to smooth slip acceleration.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system comprising:
   a pressure control solenoid;
   a flow control solenoid having an input in fluid communication with the pressure control solenoid;
   a piston that adjusts a position of a shift fork of a dual clutch transmission and that includes a first area in fluid communication with the pressure control solenoid and a second area in fluid communication with the flow control solenoid;
   a slip sensing module that estimates slip acceleration;
   a flow determining module that generates a flow command for the flow control solenoid; and
   a sync control module that determines a slip acceleration profile including an estimated slip acceleration, that adjusts the estimated slip acceleration based on a measured slip acceleration to generate an adjusted slip acceleration, and that generates a pressure command for the pressure control solenoid based on the adjusted slip acceleration.

2. The control system of claim 1, wherein the sync control module includes a slip acceleration module that generates the slip acceleration profile based on an initial slip acceleration and a predetermined sync time.

3. The control system of claim 2, wherein the sync control module further includes an error module that generates a slip acceleration error based on the estimated slip acceleration and the measured slip acceleration.

4. The control system of claim 3, wherein the sync control module further includes a summing module that generates the adjusted slip acceleration based on the estimated slip acceleration and the slip acceleration error.

5. The control system of claim 4, wherein the sync control module further includes a force converter module that generates a force command based on the adjusted slip acceleration.

6. The control system of claim 5, wherein the sync control module further includes a pressure converter module that generates the pressure command based on the force command.

7. The control system of claim 1, wherein the slip acceleration profile includes a first portion that ramps to a maximum value, a second portion that is constant at the maximum value, and a third portion that ramps towards zero at a first rate.

8. The control system of claim 1, wherein the second area is larger than the first area.

9. The control system of claim 1, wherein the shift fork is moved from a neutral position to a sync position.

10. The control system of claim 1, wherein the flow command is a constant flow command during synchronization.

* * * * *